April 17, 1962 C. W. BAKER ET AL 3,030,038
TOROIDAL COIL WINDING MACHINES
Filed Aug. 26, 1957 7 Sheets-Sheet 1

Fig.1

Inventors
Corwin W. Baker
Paul A. Brumby
Arnold P. Christensen
Frederick S. Sillars
By their Attorney April 17, 1962  C. W. BAKER ET AL  3,030,038
TOROIDAL COIL WINDING MACHINES
Filed Aug. 26, 1957  7 Sheets-Sheet 5

Inventors
Corwin W. Baker
Paul A. Brumby
Arnold P. Christensen
Frederick S. Sillars
By their Attorney

Inventors
Corwin W. Baker
Paul A. Brumby
Arnold P. Christensen
Frederick S. Sillars
By their Attorney Inventors
Corwin W. Baker
Paul A. Brumby
Arnold P. Christensen
Frederick S. Sillars
By their Attorney

United States Patent Office 3,030,038
Patented Apr. 17, 1962

3,030,038
TOROIDAL COIL WINDING MACHINES
Corwin W. Baker, Salem Depot, N.H., and Paul A. Brumby, Hamilton, Arnold P. Christensen, Peabody, and Frederick S. Sillars, Beverly, Mass., assignors to Burroughs Corporation, Detroit, Mich., a corporation of Michigan
Filed Aug. 26, 1957, Ser. No. 680,042
12 Claims. (Cl. 242—4)

This invention relates to ring winding machines and more particularly to machines for winding coils comprising a preselected number of turns of wire or the like upon successive arcuate segments of a closed toroid. As herein shown, the invention is particularly well adapted for use in winding, according to predetermined schedule, a plurality of spaced fine wire coils on a closed magnetic core having only a small central aperture. While the invention is illustrated as applied to a winding machine of the general type disclosed in an application Serial No. 602,335, filed August 6, 1956, in the name of Corwin W. Baker, now Patent No. 2,905,399, granted September 22, 1959, it is to be understood that various aspects of the present invention are not limited to winding machines of that type of construction and certain aspects are not necessarily restricted to the winding of any particular form of toroidal coil.

Large quantities of toroidal coils are being produced for use in communications devices and other electrical assemblages. When, as in often the case, these coils are comprised of fine, insulation covered wire, their size and aperture are small, and the number of turns is large, the manual labor involved in their manufacture is considerable and costly, and the rate of output rather slow. The manual burden becomes greater when precise uniformity or other specified arrangement in the spacing of successive coils and of successive coil turns on a core form is required. Manually or mechanically winding a toroid of small size also becomes difficult when numerous turns are to be wound one upon another and through a central opening thus becoming increasingly constricted. This latter situation is dealt with quite successfully by machines of the type described in the above-mentioned application, a machine that is distinguished from winders of the split-ring type otherwise commercially available in that only a strand being wound extends through the core aperture, the shuttle being wholly external thereof. By way of illustrating the nature of the work to which such machines and the machine shown herein are particularly well suited, as well as to indicate one specific form of toroidal coil comprising a plurality of carefully spaced coil windings, reference may be had to an application Serial No. 621,645, filed November 13, 1956, in the names of Corwin W. Baker and Frederick S. Sillars, the method of construction and the design there disclosed relating to a magnetic memory-type coil.

In view of the conditions above indicated it is a general object of this invention to provide an improved machine for winding successive segments of toroidal coils, which machine shall be capable of winding each segment with any predetermined number of coil turns, and even though the central opening of the respective toroids is of small diameter. More particularly, it is an object of this invention to provide a novel and effective ring winding machine for progressively winding a toroidal coil formed with upstanding terminations respectively spaced and adapted to receive a loop of the wire being wound, the number of turns between terminations being wound according to selected or prescribed schedule.

In the operation of the illustrative machine a wire-carrying shuttle is rotatably driven by a variable speed motor and successive turns of wire are cast off the shuttle to be passed through and wound upon a core form. Pursuant to the objectives stated, and in accordance with a feature of the present invention, an index wheel having a frictional driving connection with the shuttle-operating mechanism is provided for rotating the core form about its axis, and means cooperative with the index wheel is arranged to control the core form rotation according to a predetermined placement schedule of coil turns required to be wound on the several segments of the core form. As herein shown, and in accordance with the disclosure of the Baker et al. application, Serial No. 621,645 referred to, a type of toroidal coil to be wound comprises a form including a core shield having a series of upstanding terminations in its end faces and a plurality of axial ribs extending between the opposed terminations. Preferably, these ribs are formed to facilitate rotation of the core forms and peripherally spaced better to accommodate the particular number of turns of wire which may be specified for each segment. Accordingly, the index wheel and its associated control means are herein employed, for example, to illustrate the placement of appropriate wire turns upon their core shield terminations and between adjacent ribs. In the organization herein shown, some of the segments being of unequal peripheral length, the index wheel operates through gearing to actuate conjugate rack mechanism engaging the axial ribs thus to control rotation of the core form being wound.

As the shuttle rotates to form a wire loop to be cast off and wound upon the core form, the index wheel is allowed to rotate the latter until the loop is about to be tightened into a turn upon the coil form. At this stage, i.e., during the wire tightening, and in accordance with another feature of the invention, the core form may be indexed or momentarily stopped from rotating by an escapement mechanism acting to interrupt rotation of the index wheel. For this purpose, as herein illustrated, one of a series of (in this case four) rotary, axially staggered pawls having operative connection with the shuttle-operating mechanism is disposed to engage one of an adjustably located plurality of pins peripherally projecting from the face of the wheel. Immediately after the wire has been drawn taut in its winding cycle, the pawl automatically disengages to allow the coil form to continue progressive rotation as required by the winding schedule. In accordance with a further feature of the invention, and by other means cooperative with the index wheel, it is caused to determine correct positioning of the shuttle for the start and finish of the core winding operation and for a preliminary supply-wire soldering operation, and also the correct initial positions of the escapement pawls are automatically established.

The above and other objects of the invention, including provision of an oscillatory snubber which holds each loop outward from the core shield to allow indexing of the core shield termination beneath the loop and hence permits placement of appropriate turns in the notched ends of the terminations, and a wire-like whisker for insuring clearance space for operation of the snubber between a prior formed loop and the loop being formed, together with novel details of construction and arrangements of parts will now be described in greater particularity, in connection with an illustrative machine in which the invention is embodied and with reference to the accompanying drawings thereof, in which:

Figure 15:
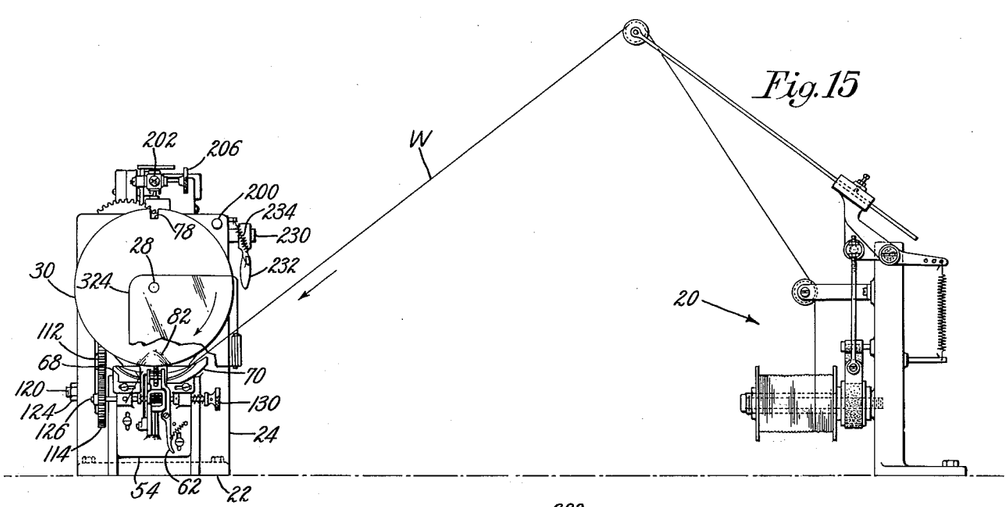
FIG. 15 is a view in front elevation of the winding machine and associated supply and wire tensioning means.

The complete, illustrative machine to be described is provided with conventional, separately mounted wire-tensioning and supplying means 20, as shown in FIG. 15. Since this invention deals with improvements made in the ring winding mechanism and more especially in the means for laying turns of wire or the like according to a planned program or schedule, attention is first invited to FIGS. 1, 2 and 3 wherein the novel construction is shown on a larger scale. The machine comprises a frame 22 adapted to be mounted on a bench or table. An upright front portion 24 of this frame and a vertically extending bracket 26 integral with the frame are formed to provide coaxial bearings for a main drive shaft 28. The latter extends horizontally through the portion 24 to support on its front end a circular rotary bobbin or shuttle 30 preferably of the general type shown and described in the Patent 2,905,399 referred to above. For operating the shuttle (counterclockwise as viewed in FIG. 3) to wind a work piece, such as a toroidal core 32 (FIGS. 1, 2 and 5) with wire W, the rearward end of the shaft 28 is connected through a flexible coupling 34 to a reduction geared motor 36 (FIGS. 3 and 16) supported by the base of the frame 22. The motor is connected in series and regulated by an electrical control system later described.

Except for the novel means herein provided for controlling rotation of the core 32 during its winding and other improvements to be described, the method of loading the shuttle 30 with the wire W to be wound and the manner of winding the core 32 remain fundamentally as disclosed in the mentioned application and are herein described only so far as is necessary better to understand the nature of the present invention. The core 32, which may be representative of any open or closed article to be wound, is for purposes of illustration a closed, magnetic-memory type core form 38 (FIGS. 5, 8) comprised of a generally cylindrical core shield 40 having upstanding wire-receiving terminations 42 in its end faces and a plurality of axial ribs 44 (some designated in sequence a, b, c, d, and e) extending between the terminations. Better to explain the operating features of the illustrative machine, it may be assumed that the program or winding schedule specified for this coil form requires certain numbers of turns (or no turns) to be wound in predetermined core segments between designated points such as adjacent ribs 44, certain turns to be spaced so as to be received in the V-notched ends of the respective terminations 42. Thus, for example, a prescribed winding schedule for the coil form 38 shown in FIG. 5 was performed by winding, in counterclockwise order (as viewed in FIG. 5) turns as follows: 39, 4, 4, 4, 0, 0, respectively.

Figure 12:
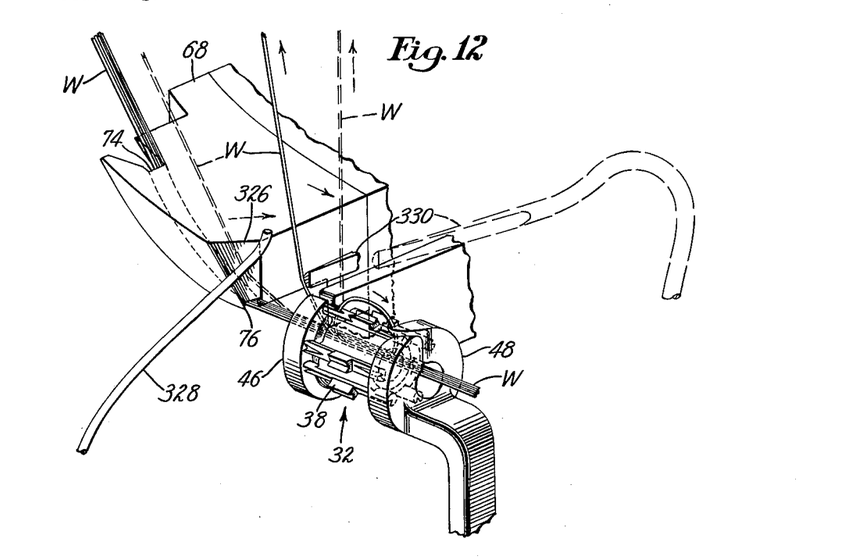
FIG. 12 is a perspective view illustrating schematically the operation of certain parts designed to guide and facilitate the conversion of wire loop formations into tight turns upon a core.

In order rotatably to support the core form to be wound a pair of cooperative, annular jaws 46, 48 (FIGS. 1, 12) is provided, each having a semi-spherical bearing formation 50 (FIG. 1) for internally engaging and appropriately centering the opening in the core form so that its axis extends horizontally beneath the shuttle and directly below its rubber-tired, wire-carrying groove 52. The core form axis is thus held in operative position and substantially at right angles to the axis of rotation of the shuttle. The jaws and their formations 50 are formed respectively with radial slots 53 which lie in a vertical plane and thus constitute guiding passageways for the successive loops of wire to be formed about the core and drawn taut thereon. The jaw 46 is relatively fixed and integral with a bracket 54 (FIG. 1) that is vertically adjustable toward and from the shuttle to allow for an appropriate length of winding wire thereon in relation to the length of a tightened turn on the particular core form to be wound. It will be understood that the bracket 54 and mechanism mounted thereon later to be described are fixed for a particular size of core form, but may be adjusted heightwise as a unit, the bracket being formed with vertically extending slots 56 (FIGS. 1 and 2) receiving clamp screws 58, respectively, threaded into the frame. The jaw 48 is formed on the upper end of a lever pivotally supported at 60 on the bracket 54. The lever is formed with an operating handle 62 at its lower end, and is normally urged into core supporting position by a tension spring 64 connecting the handle to the bracket. A stop pin 66 in the bracket limits movement of the handle 62 when no component is mounted in the machine.

Figure 1:
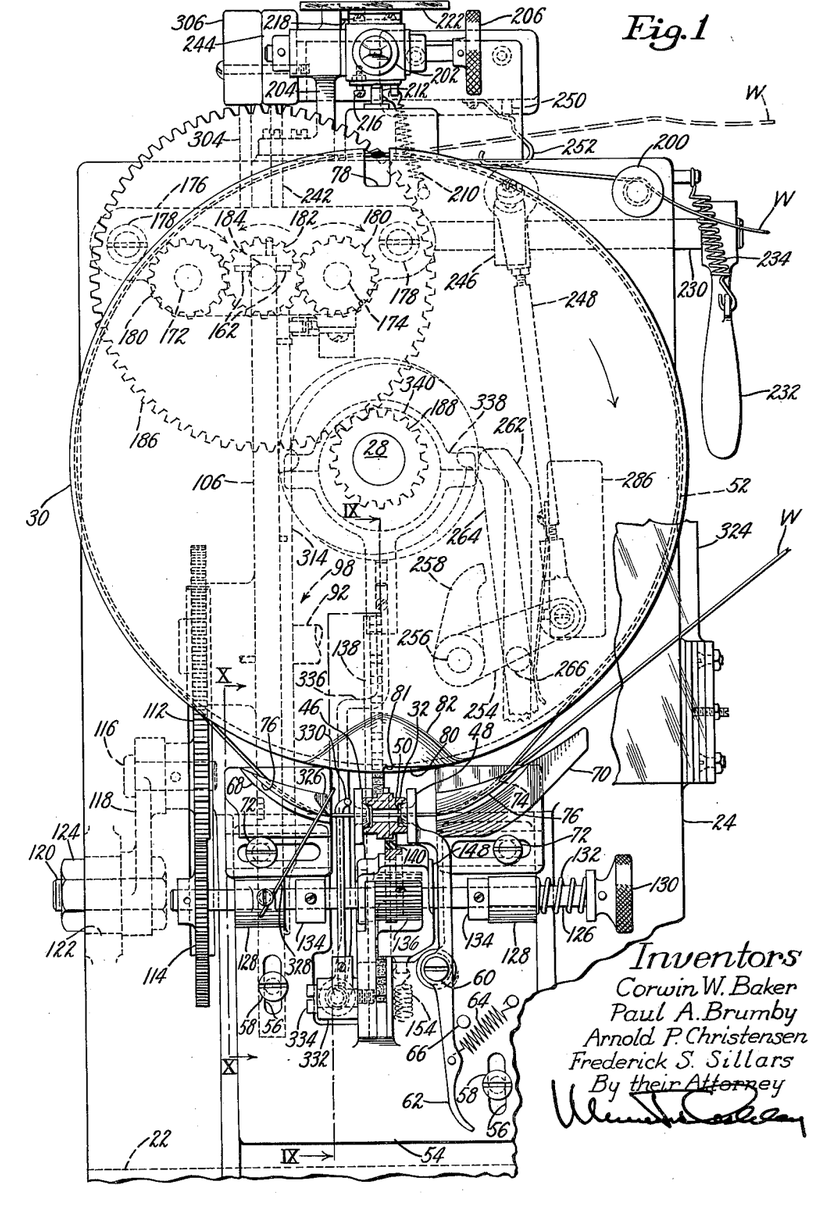
FIG. 1 is a view in front elevation of a machine exemplifying the invention and resembling in certain respects the machine disclosed in the above-mentioned application, Serial No. 602,335 now Patent No. 2,905,399.
Figure 2:
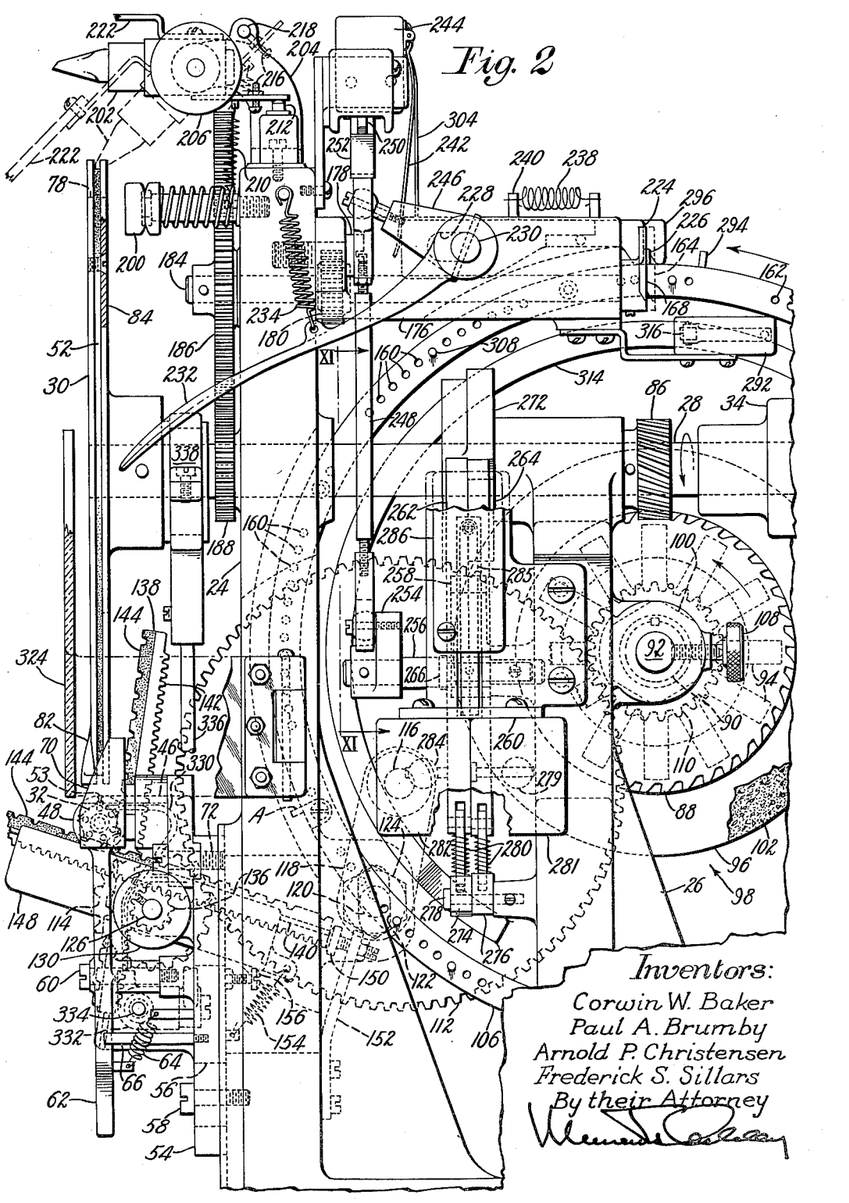
FIG. 2 is a view in side elevation of the machine shown in FIG. 1.
Figure 3:
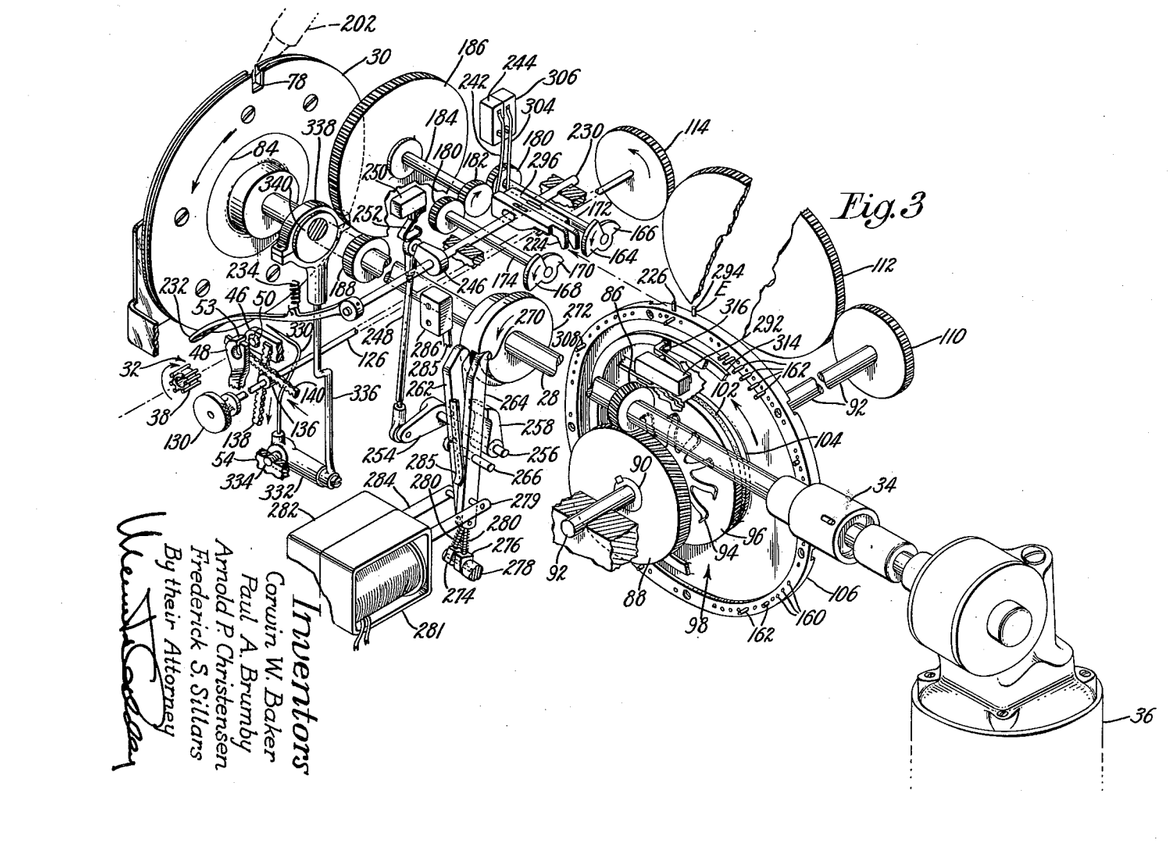
FIG. 3 is an exploded perspective view schematically indicating the mechanism for driving the shuttle and means including an index wheel controlling rotation of the core form, the parts being shown in their solder-starting positions.
Figure 13:
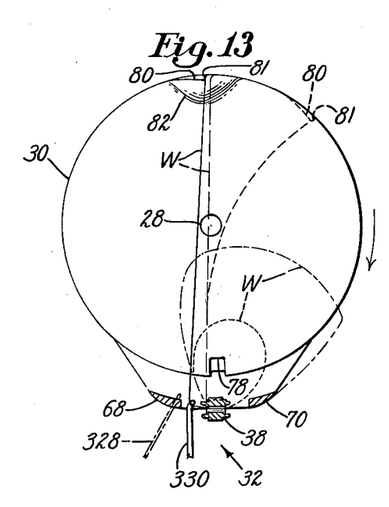
FIG. 13 is a schematic diagram, corresponding largely with the disclosure of the cited Baker application, Serial No. 602,335, now Patent Number 2,905,399, and indicating successive positions of a strand after being cast off a shuttle, and formed as a loop to be drawn taut and wound on a core.

For guiding the wire W centrally through the aperture of the mounted coil form 38 (or of one having a different axial length), the bracket 54 is provided with horizontal ways for slidably receiving projecting portions of guide blocks 68, 70 (FIGS. 1, 12 and 13) respectively. Clamping screws 72, 72 respectively extend through horizontal slots in the blocks and are threaded into the bracket to fix the normally stationary blocks in relation to opposite end faces of any particular form to be wound. Each block has an arcuate wire-receiving slot 74 aligned with the shuttle groove 52 and an overhanging lip 76 for normally retaining in the slots turns of continuous wire wound in the groove and passing through the core aperture. The manner in which the shuttle is initially loaded with wire for winding each core will be explained subsequently, it being noted for the present that, as in the Baker application Serial No. 602,335, now Patent Number 2,905,399, the shuttle 30 is provided with a peripheral slot 78 (FIGS. 1–3) to facilitate a soldering operation, and with a paying-out recess 80 (FIGS. 1, 13) having a radial kinking wall 81 communicating with the groove 52 diagonally opposite to the slot 78. Also, the front face of the shuttle is, in the present case, flat instead of slightly convex and has only a rounded "blister"

or protrusion 82 (FIGS. 1 and 2) adjacent to the recess 80 to compensate for its depth and thus to insure tensioning of each of the successive loops of wire to be cast off the shuttle for core winding, as will be explained. By way of indicating a construction detail, the shuttle in this case has screwed to its front face, as shown in FIGS. 2 and 3, an annular back flange 84 for retaining wire in the groove 52.

Turning now to the means for rotating the mounted coil form about its axis in the course of operation of the shuttle, a helical gear 86 (FIGS. 2, 3, 11) secured on the main drive shaft 28 is arranged to mesh with a gear 88 splined to a bearing sleeve 90 rotatable on a stub shaft 92. The stub shaft 92 is supported in an ear formed on the bracket 26. A reduced end portion of the sleeve receives a clutch spring 94 for constantly driving a plate 96 of a friction slip clutch generally designated 98. A nut 100 (FIGS. 2, 11) threaded on an intermediate portion of the sleeve bears on the spring 94 and thus serves to exert and maintain a suitable pressure of engagement by the spring on the plate 96 and hence, through a friction disk 102, upon the hub 104 (FIG. 3) of an index wheel 106 (FIGS. 1–4, 6 and 7). This wheel is rotatably mounted on the stub shaft 92 and not only serves to program and position the successive turns of wire being wound on the core form, but performs several other important functions subsequently to be described. Preferably, in order to reduce inertial forces, the index wheel 106 is of a light-weight material such as aluminum. To facilitate removal of the index wheel and, if desired, to permit easy substitution of a modified index wheel for programming cores to be wound according to a different schedule of turns, a single thumbscrew 108 (FIG. 2) threaded into the ear of the frame 26 and normally engaging the stub shaft 92 endwise is loosened to permit withdrawal of the stub shaft. From the foregoing it will be apparent that frictional drive of the index wheel 106 is derived from the shuttle operating mechanism.

Gearing next to be explained and having operative connection with the index wheel 106 is arranged to be coupled to the core form 38 to rotate it about its axis. Thus, a gear 110 (FIGS. 2, 3 and 11) rotatably mounted on the stub shaft 92 and keyed to the wheel 106 is in mesh with an intermediate gear 112 (FIGS. 1, 2, 3) which, in turn, is normally in mesh with a gear 114. The latter is rotated somewhat faster than the index wheel. Since the gear 114 may, under certain circumstances and when operating to wind certain work pieces, have to be repositioned heightwise, the gear 112 is rotatably carried on a pin 116 (FIG. 1) in the upper end of a lever 118, the lower end of which is adjustably supported by a stud 120 extending through a vertically disposed slot 122 formed in an ear of the frame portion 24. A nut 124 threaded on the stud 120 clamps the lever 118 to the frame in appropriate position. The gear 114 is affixed on one end on a core operating shaft 126 (FIGS. 1–3, 8 and 9) which is rotatably and axially movable in coaxial bores of lugs 128 (FIG. 1) formed on the bracket 54. For uncoupling the gear 114 from the gear 112, a knob 130 pinned to an end of the shaft 126 may be gripped to shift the latter axially to the left as viewed in FIG. 1. A compression spring 132 on the shaft 126 and confined between one of the lugs 128 and the knob 130 normally serves to retain the gear 114 in mesh, collars 134, 134 on the shaft 126 limiting its axial movement. Secured on the shaft 126 is a pinion gear 136 (FIGS. 1–3, and 8) having adequate axial length to stay in mesh with a pair of angularly disposed, conjugate racks generally designated 138, 140 (FIGS. 1–3, and 8) whether the gear 114 be operatively positioned or not. It will be appreciated that suitable means other than conjugate racks may be employed for imparting rotation of the shaft 126 to a core form to be wound, a single rack of uniformly spaced teeth, for instance, being satisfactory for rotating core form having equally spaced, peripheral projections.

Figures 9, 10, 11:
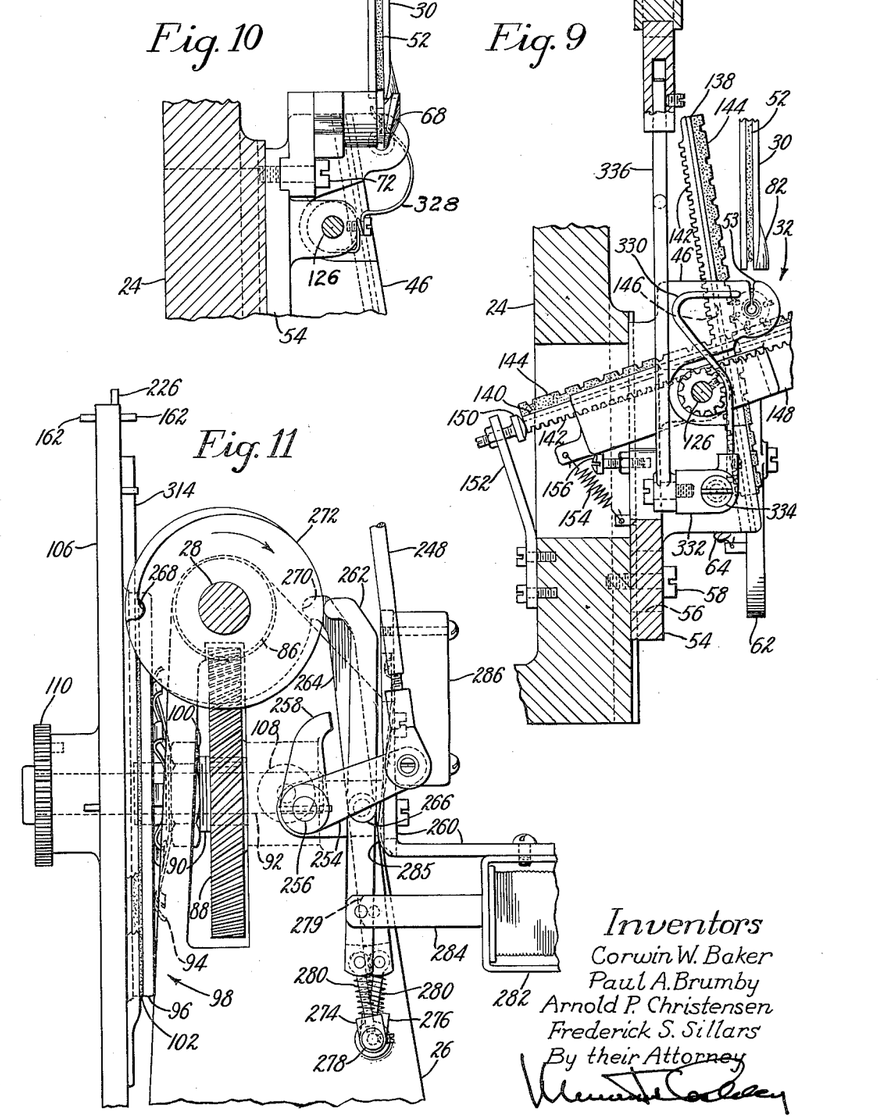
FIG. 9 is a section taken on the broken line IX—IX of FIG. 1.
FIG. 10 is a section taken on the line X—X of FIG. 1.
FIG. 11 is a section taken on the line XI—XI of FIG. 2 and showing stop-start control mechanism.

Experience has indicated that for unequally spaced core ribs 44, or the like, continuous, accurate control throughout 360° of core winding may be attained by suitable angular disposition of the pair of racks 138, 140. The illustrated racks are juxtaposed at an acute angle of about 81°, but it will be understood that other work pieces may well require other arrangement and differently designed teeth. As herein shown the racks 138, 140 are composite in that each has a pinion-engaging rack 142 of uniformly spaced teeth and a core-engaging rack 144 of non-uniformly spaced teeth. The latter is preferably of rubber composition and cemented to its adjacent rack 142. Different pairs of composite racks may be used for different types of cores to be wound, or merely appropriate core-engaging racks may be interchanged when necessary. The rack 138 is reciprocable heightwise of a guideway 146 (FIGS. 8 and 9) in the relatively fixed jaw 46, and the rack 140 is reciprocably carried by a guideway 148 pivotally mounted on the shaft 126. As best shown in FIGS. 2 and 9, for determining the correct starting position of the rack 140 an end thereof abuts an adjustable stop 150 threaded into an arm 152 secured to the frame portion 24, and the guideway 148 is yieldably held by a tension spring 154 against a stop screw 156 threaded into the bracket 54. When in their correct starting positions the racks 138, 140 should engage the ribs 44 of the core form to be wound and properly align a point (such as a termination or rib 44) selected thereon for the start of the winding with the jaw slots 53.

Figures 4, 5, 6, 7, 8:
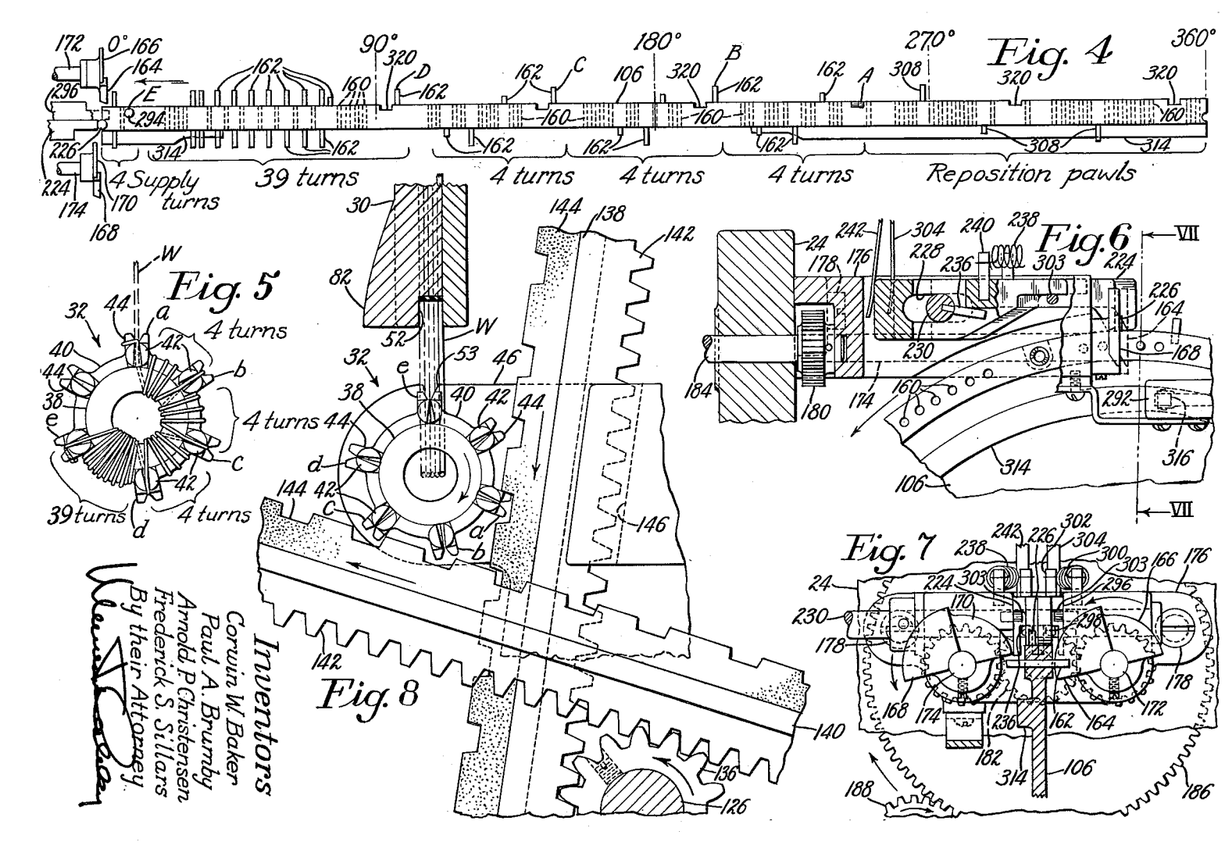
FIG. 4 is a development of the index wheel shown in FIGS. 1, 2 and 3.
FIG. 5 is an end view (magnified about four times) of a small toroidal coil wound by the machine as scheduled on the index wheel of FIGS. 4 and 5.
FIG. 6 is a detail view in side elevation and partly in section showing a portion of the index wheel and associated stop-start control mechanism.
FIG. 7 is a section taken on the line VII—VII of FIG. 6.
FIG. 8 is an enlarged view of the coil form and operating racks shown in FIG. 2 at that initial stage of operation when soldering of a first loop may be done in preparation for loading the shuttle and the component with winding wire.

As explained in the Baker application Serial No. 602,335, now Patent Number 2,905,399, successive loops of wire cast off the shuttle for winding on the core form are each drawn taut and kinked in a revolution of the shuttle when the wire turn being formed extends from the component and diametrically across the front face of the shuttle to the recess 80 and the kinking wall 81. As this wire-tensioning portion of each winding cycle may be critical and caution must be observed in avoiding breaking or overly sharp kinking of the fine wire, the index wheel 106 is adapted, as will be explained, to interrupt or retard rotation of the core form momentarily while the shuttle effects wire tensioning as indicated. A principal function of the wheel 106 is a scheduling or controlling of the placement of the turns of wire upon the core form. For this purpose, as herein shown, only a portion of the periphery of the index wheel 106 normally need be used, i.e. the core form will have completed one revolution when only a fraction of a revolution has been completed by the index wheel. Referring to FIGS. 2–4, the rim of the wheel is thickened and provided with a plurality of axially extending, concentrically arranged bores 160. The spacing of these bores is usually selected with a view to enabling the particular wheel 106 to fulfill the maximum variety of winding schedules of which it is potentially capable, though it will be appreciated that since it is readily interchangeably mounted in the machine, it may be preferable to provide several index wheels each designed in the manner to be indicated but adapted individually to fulfill particular winding schedules. Selected bores 160, according to the particular predetermined winding schedule to be performed, receive face pins designated 162 which, as herein shown and for reasons later explained, may effectively extend in one of four different ways from the opposite marginal faces of the wheel 106. This is to say that a pin 162 may project from either face of the wheel only a short distance, in which case it is hereinafter referred to as a "short pin," or it may project from either face a longer distance, in which case it will be termed a "long pin"; if it projects from one face for only the short distance but projects the longer distance from the opposite face, the pin may be termed "short" or "long" according to whether its effective portion being referred to is short or long. The selected peripheral spacing of the face pins 162, which are arranged to cooperate with escapement mechanism next to be explained, largely determines the peripheral placement of the successive turns as they are formed on the core form.

As herein illustrated, escapement mechanism comprising axially spaced, rotary pawls 164, 166, 168, and 170 (FIGS. 3 and 7) is provided. The pawls 164, 166 are mounted on the rearward end of a shaft 172 and are in the form of contiguous 90° sectors, respectively, the operating surfaces of the several pawls being spaced axially by equal increments. The pawl 168 and the pawl 170 constitute a pair of contiguous 90° sectors mounted on the rearward end of a shaft 174 parallel to the shaft 172. These shafts are journaled in a block 176 (FIGS. 1, 6 and 7) secured by screws 178 to the frame portion 24, and are rotated in phase in the same direction, being driven from the main shaft 28 as shortly will be described. The pawls 164, 166 are thus disposed to engage face pins 162 projecting from one face of the index wheel 106, and the pawls 168, 170 are disposed to engage pins 162 projecting from its opposite face. Since the pawls 166 and 170 are of shorter radius than the pawls 164, 168, the pawls 166, 170 engage the longer pins 162, but not the shorter ones, whereas the pawls 164, 168 may engage both long and short pins. Affixed on the front end of each of the shafts 172, 174 is a gear 180 (FIGS. 1 and 3) meshing with a gear 182 secured to the rearward end of a shaft 184 journaled in the frame 24. The front end of the shaft 184 (FIGS. 1–3) carries a gear 186 driven by a pinion gear 188 on the main drive shaft 28. The arrangement shown accordingly is such that four revolutions of the main shaft occur for each revolution of the 90° rotary pawls. Hence, in any winding revolution of the shuttle 30 one of the four pawls is in position to interrupt or retard rotation of the core form 38 by engaging a pin 162 (assuming the latter to have been spaced for pawl engagement) and thus reduce the pitch of a loop being wound as it is about to be drawn taut. If a long pin 162 projects from each of the opposite faces of the index wheel, this pin will normally successively engage the pawls 164, 166, 168, and 170 to provide for an appropriate degree of delayed turning of the core form between the tightenings of four successively placed loops; in other words, a double long pin determines as many as four successive delays or indexed positions for wound turns on the core. If there is a long pin projecting from one face coupled with a short pin projecting from the opposite face, retarded turning of the core form is provided for as many as three successive windings thereon or it may be said that the core form is successively indexed as many as three times; if there is a long pin projecting from merely one face, core form turning is correspondingly effected for two successive windings; in like manner if there is only a short pin projecting, it locates a single turn of wire being wound on the core. The foregoing general formulations are subject to some modification in that the maximum number of indexed positions produced by a face pin 162 may be reduced if it is spaced from a preceding face pin by less than the axial spacing of the operative surface of the pawl 164 from the operative face of the pawl 170 (plus necessary tolerances). Thus a double long pin, for instance, may first engage a shorter radius pawl 166 or 170 in which case only 3 or 1 indexed position(s) would be provided instead of 4. This reduction in indexed positions is at times planned by proper location of the double long pin relatively to a preceding short or 3-turn pin. Similarly, a normally 3-turn pin (i.e. long on one face and short on the other face) may by reason of its spacing behind a short pin yield only two indexed positions. In general, then, if there are no pawl engagements with the pins 162, the core winding proceeds uninterruptedly with uniform pitch per turn, and any pawl engagements with pins 162 tend to reduce the pitch of the core windings. A greater number of such engagements with the face pins in consecutive bores 160 therefore results in a closer spacing of the consecutive core turns. Referring to FIG. 4, it will further be seen that the peripheral spacing of certain pins 162 (designated B, C, D, and E to correspond respectively with core ribs $b$, $c$, $d$, and $e$) is selected to place particular turns of the wire at predetermined points on the core, in this case in the V-notches of its terminals 42.

Figure 16:
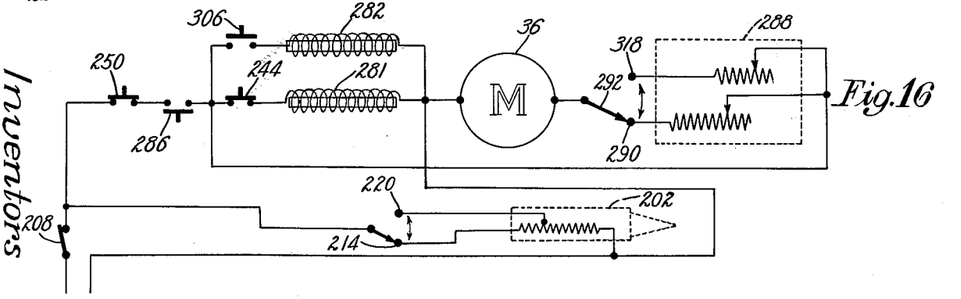
FIG. 16 is a schematic diagram of the electrical controls and soldering gun.

In initially loading the machine the wire strand from the tensioning-supplying means 20 is passed through the slot 74 of the block 70, through the opening of a positioned core 32 and its supporting jaws 46, 48, through the slot 74 of the guide block 68, around the wire carrying groove 52 of the shuttle 30, and then again through the slot 74, etc., to complete a convolution, the loose end of the supply wire being temporarily anchored on a pin 200 (FIG. 1) in the frame 24. At this stage of operation the shuttle slot 78 is in the position indicated in FIGS. 1 and 3, and a soldering iron 202 pivotally supported by a bracket 204 on the frame 24 is tilted downward from its normally raised, inoperative position by means of a hand knob 206 to its operating position in the slot 78 to solder the single loop of wire first laid on the shuttle to the strand anchored to the pin 200. The preferred arrangement is that when a main switch 208 (FIG. 16) of an electrical control system later to be described is closed, the iron 202 in its inoperative position, as determined by a spring 210 (FIGS. 1 and 2) and a stop 212 on the frame, will be maintained at a low heat condition by reason of a circuit being closed through a contact 214 (FIG. 16). When moved to operating position, as determined by engagement of a screw 216 (FIG. 2) with a stop pin 218 in the bracket 204, the iron 202 is shifted from its low heat condition to a high heat condition, the contact 214 being automatically opened and a contact 220 closed to provide the required lesser electrical resistance. A transparent guard 222 on the soldering iron protects an operator against solder splatter. The short length of unneeded wire extending from the anchor pin to the soldered joint is then severed close to the latter.

The index wheel 106 is further adapted to measure off an appropriate length of supply wire to be wound and to insure that the shuttle 30 as well as the rotary pawls 164, 166, 168 and 170 will assume their correct starting positions. In this initial stage of operation the index wheel 106 is in the position indicated in FIGS. 2, 3, 4, 6 and 11, and hence the rearward end of a switch actuating latch 224 (FIGS. 3, 6 and 7) is in engagement with a pin 226 radially projecting from the outer perimeter of the index wheel. The latch 224 has been displaced forwardly by the pin 226 and is formed with a horizontally disposed slot 228 (FIG. 6) for receiving a control rod 230 having a manually operated starting lever 232 secured to one end thereof. The rod extends through, and is rotatable in, the block 176. The lever 232 is normally retained in an upper, inoperative position by a tension spring 234 (FIGS. 1, 2 and 3). On depressing and releasing the starting lever 232 to commence loading of additional turns of winding wire on the shuttle 30, an insert 236 (FIG. 6) in the rod 230 acts to raise the latch 224, and thus frees the pin 226 for counterclockwise rotation, as seen in FIG. 6, and permits a tensioned spring 238 having one end connected to the block 176 and its other end secured to a pin 240 in the latch to shift the latter rearward. As a consequence a leaf spring 242 (FIGS. 2, 3, 6 and 7) engaging the latch 224 is allowed to open a switch 244 (FIGS. 2, 3 and 16). The depression of the lever 232 will simultaneously have actuated other electrical means controlling the motor 36 as will now be explained. Thus, a ball-ended arm 246 on the rod 230 having connection with a link 248 is moved counterclockwise, as viewed in FIGS. 2 and 3, until the starting lever is released to depress the link. As a result a normally closed interlock switch 250 (FIGS. 1, 3 and 16) is permitted by a leaf spring 252 engaging the link to be opened, and the link 248 is further effective, by means of its connection through a crank arm 254 with a shaft 256, to actuate a trip arm 258 secured on the shaft 256. The latter is rotatably supported in a bracket 260 secured to the bracket 26. The upper end of the trip arm is sufficiently broad to engage (at different times) a pair of latching levers 262, 264 (FIGS. 1, 2, 3 and 11) which are pivotally mounted on a pin 266 carried by the bracket 260. The levers 262, 264 have rounded upper ends adapted to cooperate respectively with diagonally opposed recesses 268, 270 (FIG. 11) formed in a rotary stop disk 272 secured on the main shaft 28. As shown in FIG. 3, seating of the end of the lever 264 in the recess 270 corresponds with proper initial positioning of the shuttle slot 78 and of the rotary pawls 164, 166, 168 and 170. The lower ends of the levers 262, 264 are connected in toggle relation to levers 274, 276, respectively, which are pivotally supported at their lower ends on a pin 278 projecting from the bracket 26. Thus, for urging each of the levers 262, 264 into broken toggle condition to retain their latched or unlatched relation to the rotary stop 272, compression springs 280, 280 are respectively confined on the levers 274, 276 between shoulders formed thereon and the lower ends of the levers 262, 264. Depression of the starting lever has accordingly caused the trip arm 258 to unlatch the lever 264 from the recess 270 thereby unlocking the shaft 28, and has ineffectively shifted a solenoid plunger 279 of a solenoid 281 (FIGS. 3, 16) to extended position, the plunger being connected to the lever 264. The solenoid 281 and an adjacent solenoid 282 having a plunger 284 connecting the latter to the lever 262 are supported by the bracket 260 for reasons to be explained. With both of the levers 262, 264 now unlatched, a leaf spring 285 closes a switch 286 (FIGS. 1–3, 11, and 16). (Both of the levers 262, 264 must be unlatched to close the switch 286.) Now upon releasing the depressed starting lever 232 to reclose the switch 250 a circuit for operating the motor 36 is completed through the switch 286, a high-low speed control generally designated 288 (FIG. 16), and a low-speed contact 290 of a two-way switch 292. Winding of the wire upon the shuttle 30 and through the core aperture (as suggested in FIG. 8) proceeds automatically until a pin 294 (also designated E to correspond with the rib C) (FIGS. 3 and 4) in the outer rim of the index wheel 106 engages and forwardly displaces a switch actuating latch 296 which, like the adjacent latch 224, is formed with a horizontal slot for receiving the rod 230 and is liftable by an insert 298 (FIG. 7) in the latch. Also in like manner, a spring 300 (FIG. 7) connected at one end to the block 176 and having its other end secured to a pin 302 in the latch 296 is now tensioned and urges the latch rearwardly. Support pins 303 (FIGS. 6 and 7) in the block 176 respectively limit the latches 224, 296 against clockwise movement, as seen in FIG. 6. Forward movement of the latch 296 actuated a leaf spring 304 to close a switch 306. As a result the solenoid 282 is energized to seat the lever 262 in the recess 268, reopen the switch 286, and stop the motor 36. The shuttle is now in correct starting position (recess 80 and protrusion 82 at the top) for core winding, four convolutions for instance having been added prior to engagement of the pin 294 with the latch 296. Had prior core winding experiments dictated a different number of supply turns when needed, the pin 294 would have been differently spaced from the pin 226. Certain "extra" face pins 308 (FIG. 4) in the index wheel 106 have been provided to insure its further retardation to reposition the pawls 164, 166, 168 and 170 in their correct initial starting positions shown in FIGS. 3 and 7. It is essential that the starting position of these pawls be thus properly correlated to the starting position of the index wheel.

Figure 14:
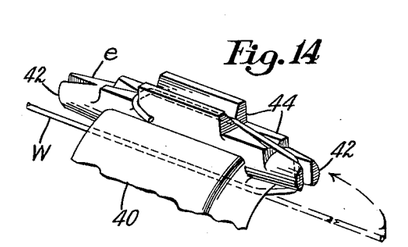
FIG. 14 is a perspective view of a portion of a core shield and indicating one way of anchoring thereon an end of the length of supply wire on the shuttle which is to be wound on the core.

Preparatory to winding the core an operator now severs the strand of supply wire, manually casts off the last convolution of winding wire from the guide block 68, and then bends the loose end of the wire to anchor it on the upper and accessible starting rib 44, designated e in FIGS. 4, 5 and 14. This last step is shown diagramfatically in FIG. 14. When ready to have the loaded machine wind the core 32 the operator merely engages the rack gear 114 with the index mechanism by means of the knob 130 and depresses and releases the starting lever 232. The latch 296 is thus lifted off the pin 294 to free the index wheel 106 for rotation and the switch 306 is reopened to deenergize the solenoid 202 and thus permits unlocking of the lever 262. Simultaneously, depression of the lever 232 opens the switch 250, and the trip arm 258 acts to unlock the lever 262 from its recess 268, the release of the starting lever 232 thereupon reclosing the switch 250, and the unlatched levers 262, 264 close the switch 286. A motor operating circuit is then completed through the speed control 288 and the switches 286, 250 and 208. Core winding accordingly commences and at a relatively low speed since the high-resistance contact 290 (FIG. 16) of the switch 292 (FIGS. 3 and 6) is then in closed position. After completing a few core turns, in the sector scheduled to receive 39 turns for example, as indicated in FIG. 4, a cam 314 on the index wheel 106 permits a follower 316 (FIGS. 3 and 6) to open the contact 290 and close a low-resistance contact 318 (FIG. 16), thus automatically shifting the motor to a higher speed. The winding schedule is performed by the machine through the successive sectors at the higher speed until near the completion of the last sector to be wound, when the cam 314 dictates slower speed for the final turns and thereafter throughout the continuous interval alloted to repositioning of the pawls 164, 166, 168 and 170 and to reloading of the shuttle for the next core to be wound. Since no turns are scheduled for the last two sectors of the core being wound, a lug A (FIGS. 2 and 4) is secured in a selected slot 320 in a face of the wheel 106 and radially projects therefrom. This lug locates the final turn of wire, for instance at the rib 44 designated a, and stops the motor 36 by engaging and forwardly displacing the latch 296 to open the switch 306, etc., as above explained. After removing the completed core, the operator disengages the gear 114, returns the racks 138, 140 to their starting positions, and depresses and releases the lever 232 to move the shuttle 30 to its solder position.

Means are included in the illustrative machine better to facilitate loop forming. Thus a transparent shield 324 (FIG. 1) hinged to the frame portion 24 serves, when in operating position, to prevent each loop in the course of its forming from flopping forwardly away from the shuttle 30. Also, in cooperation with a smoothly beveled face 326 (FIG. 12) of the guide block 68, a guide wire 328 (FIGS. 1, 10 and 12) sometimes termed a "whisker," adjustably mounted in the bracket 54 is effective to provide, between each loop just formed and the wire of the loop about to be formed, a clearance space for the operation of an oscillatory snubber 330 (FIGS. 1, 3, 9 and 12). The function of the latter is to hold each loop momentarily out from the end face of the core shield to allow it to be rotated for movement of a termination 42 into position to receive the strand in its notch. The snubber is in the form of a slightly flexible, bent wire and is secured at one end to a lever 332 fulcrumed on a pin 334 in the bracket 54. For oscillating the snubber so that its strand-engaging end moves forwardly and rearwardly the lever 332 is connected to the lower end of an eccentric rod 336 (FIGS. 1–3, 9) which, together with an eccentric strap 338, is secured on a disk 340 eccentrically mounted on the main shaft 28. In order to insure clearance for the strand-engaging end of the snubber, the whisker operates to accelerate a prior formed loop and to retard the wire of the loop about to be formed. When the snubber moves rearwardly it releases the loop to be formed to permit it to be drawn taut into the notch of the termination 42. It will be understood that operation of the whisker and snubber is ineffectual except when a projecting termination is scheduled to receive a strand, and hence they may be omitted from the machine when winding core forms devoid of terminal projections.

From the foregoing it will be appreciated that this invention provides a compact, versatile, and yet relatively simple machine which may be used by an unskilled operator to perform a large variety of winding schedules. Moreover, the novel, simplified core rotating mechanism herein described may be adapted to split-ring winding machines as well as those of the type herein illustrated, the organization in either case thus yielding a higher production of multiple coil cores.

Having thus described our invention, what we claim as new and desire to secure by Letters Patent of the United States is:

1. In a coil winding machine, means for operating a wire-carrying shuttle, means for rotating a core form to be wound with wire and comprising a pair of conjugate racks, a gear train for operating said racks, a driven index wheel connected to the gear train, and means controlled by the shuttle operating means for cooperating with the index wheel to delay its rotation at selective intervals whereby selected turns are predeterminedly spaced on the core form.

2. In a coil winding machine, means for operating a wire-carrying shuttle, means for rotating a core form to be wound with the wire and comprising a pair of conjugate racks, a gear train for operating said racks, a driven index wheel connected to the gear train, said wheel having projections spaced to correspond to the desired spacing of the loops to be wound on the core form, and means controlled by the shuttle operating means for cooperating with the index wheel projections to delay its rotation at selective intervals whereby selected turns are predeterminedly spaced on the core form.

3. In a coil winding machine, means for rotatably supporting a core form to be wound, a rotary shuttle for forming loops successively on the core form, means for rotating the shuttle to wind and tension the loops as they are formed, an index wheel driven by the shuttle rotating means for causing the core form normally to rotate with uniform speed about its axis, projections spaced on said wheel to correspond with the desired number and placing of the loops on the core form, and means operable in predetermined speed relation to the shuttle for cooperating with said projections to delay the index wheel at selected intervals whereby the grouping of the turns on the core form may be varied to accord with winding schedules.

4. A coil winding machine as set forth in claim 3 and further characterized in that said index wheel projections are in the form of adjustably spaced, peripheral face pins.

5. A coil winding machine as set forth in claim 4 and further characterized in that said means cooperating with the index wheel projections is in the form of an escapement mechanism comprising rotary, axially spaced pawls.

6. A machine as set forth in claim 3, and further characterized in that the machine includes means controlled by the index wheel for changing the speed of the shuttle rotating means at selected points in the course of a cycle of the wheel.

7. A machine as set forth in claim 3 and further characterized in that the machine includes mechanism for coordinating the starting positions of the index wheel and the rotary shuttle when the latter has been rotated to receive the required turns of winding wire.

8. In a coil winding machine having a rotary shuttle, and means for rotating the shuttle to load it and then wind successive loops on a rotary core form spaced bodily therefrom, a member operated by said shuttle rotating means for rotating the core form as it is being wound, said member having selectively spaced projections determinative of the winding schedule, and mechanism connected to said shuttle rotating means and arranged to be engaged by the projections of said member for automatically interrupting its operation during selected revolutions of the shuttle.

9. A machine for winding a core form with a continuous strand, said form having one or more projecting portions adapted to receive the strand as it is being wound, comprising a rotary shuttle for paying out the strand, means for rotatably supporting the core form adjacent to the shuttle and having a passageway for the successive loops of strand to be formed and tensioned by the shuttle on the core form, and means movable in timed relation to the shuttle to engage a loop to hold it out from the core form in the vicinity of each projecting portion as the latter is rotated into strand-receiving position.

10. A machine as set forth in claim 9 and further characterized in that the last mentioned means includes a strand-engaging snubber mounted for movement adjacent to the passageway in the core form supporting means.

11. A machine as set forth in claim 10 and further characterized in that a wire guiding block is mounted adjacent to the snubber and formed with a surface over which the successively formed loops pass, and a whisker is mounted yieldingly to be engaged by the loops thus passing to provide operating clearance for the snubber between a prior formed loop and the strand of the loop next to be formed.

12. In a coil winding machine having a rotatable shuttle for winding a strand onto a toroidal core, means external to the shuttle comprising a pair of jaws formed with bearing surfaces for yieldingly engaging the core at its respective end faces, said jaws being radially slit to provide passageway for the strand from the shuttle, and means for rotating the core supported by said jaws to receive the loops of strand, said core rotating means including a pair of core-engageable, conjugate racks angularly disposed with respect to each other.

References Cited in the file of this patent

UNITED STATES PATENTS

| 2,196,463 | Holleran | Apr. 9, 1940 |
| 2,444,126 | Wirth | June 29, 1948 |
| 2,569,657 | Beauregard | Oct. 2, 1951 |
| 2,639,864 | Hale | May 26, 1953 |
| 2,726,817 | Barrows | Dec. 13, 1955 |

FOREIGN PATENTS

| 523,338 | Great Britain | July 11, 1940 |
| 639,177 | Great Britain | June 21, 1950 |